US012406328B2

(12) United States Patent
Rakshit et al.

(10) Patent No.: US 12,406,328 B2
(45) Date of Patent: Sep. 2, 2025

(54) GENERATIVE ADVERSARIAL NETWORK BASED DIGITAL IMAGE ENHANCEMENT THROUGH DISTRIBUTED RESOURCES

(71) Applicant: INTERNATIONAL BUSINESS MACHINES CORPORATION, Armonk, NY (US)

(72) Inventors: Sarbajit K. Rakshit, Kolkata (IN); Sathya Santhar, Ramapuram (IN); Sridevi Kannan, Chennai (IN); Samuel Mathew Jawaharlal, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 626 days.

(21) Appl. No.: 17/650,277

(22) Filed: Feb. 8, 2022

(65) Prior Publication Data

US 2023/0252601 A1 Aug. 10, 2023

(51) Int. Cl.
*G06T 3/4046* (2024.01)
*G06N 5/022* (2023.01)
(Continued)

(52) U.S. Cl.
CPC ......... *G06T 3/4046* (2013.01); *G06N 5/022* (2013.01); *G06T 3/4092* (2013.01); *G06T 5/80* (2024.01);
(Continued)

(58) Field of Classification Search
CPC ........... G06T 3/4046; G06T 7/73; G06T 5/80; G06T 3/4092; G06T 2207/20081; G06T 2207/20084; G06N 5/022
See application file for complete search history.

(56) References Cited

U.S. PATENT DOCUMENTS 11,030,726 B1 * 6/2021 Minor ................ G06F 18/214
2013/0132867 A1 5/2013 Morris
(Continued)

OTHER PUBLICATIONS

Jiang et al., "Generative Adversarial Network for Image Super-Resolution Combining Texture Loss," Appl. Sci. 2020, 10, 1729; doi: 10.3390/app10051729, 13 pages.
(Continued)

*Primary Examiner* — Emily C Terrell
*Assistant Examiner* — Winta Gebreslassie
(74) *Attorney, Agent, or Firm* — Anthony M. Pallone

(57) ABSTRACT

According to one embodiment, a method, computer system, and computer program product for digital image enhancement is provided. The embodiment may include receiving a digital image being navigated by a user. The embodiment may include identifying an image content navigation pattern of the user and a context of the digital image. Based on the image content navigation pattern and context, the embodiment may include identifying one or more objects of the digital image on which the user will perform a predicted zoom-in action. The embodiment may include identifying one or more distributed computing resources for digital image enhancement of the identified one or more objects. The embodiment may include performing digital image enhancement of the identified one or more objects. Upon the user performing a zoom-in action on an identified object which matches a predicted zoom-in action, the embodiment may include displaying a digitally enhanced image of the identified object.

20 Claims, 6 Drawing Sheets

(51) Int. Cl.
   *G06T 3/4092*   (2024.01)
   *G06T 5/80*     (2024.01)
   *G06T 7/73*     (2017.01)

(52) U.S. Cl.
   CPC ...... *G06T 7/73* (2017.01); *G06T 2207/20081* (2013.01); *G06T 2207/20084* (2013.01)

(56) References Cited

U.S. PATENT DOCUMENTS

| | | | |
|---|---|---|---|
| 2019/0362556 A1* | 11/2019 | Ben-Dor | G06F 3/167 |
| 2020/0005088 A1* | 1/2020 | Joy | G06F 18/214 |
| 2020/0226719 A1 | 7/2020 | Chen | |
| 2020/0296155 A1* | 9/2020 | McGrath | G06F 9/5027 |
| 2021/0067701 A1* | 3/2021 | Tagra | H04N 23/951 |
| 2023/0004760 A1* | 1/2023 | Mustikovela | G06V 20/56 |

OTHER PUBLICATIONS

Mell et al., "The NIST Definition of Cloud Computing", National Institute of Standards and Technology, Special Publication 800-145, Sep. 2011, 7 pages.

Xu et al., "Image enhancement algorithm based on generative adversarial network in combination of improved game adversarial loss mechanism," Multimedia Tools and Applications 79(2), DOI:10.1007/s11042-019-07776-x, Apr. 2020, 5 pages, Abstract Only.

* cited by examiner

GENERATIVE ADVERSARIAL NETWORK BASED DIGITAL IMAGE ENHANCEMENT THROUGH DISTRIBUTED RESOURCES

BACKGROUND

The present invention relates generally to the field of computing, and more particularly to digital image processing.

Image processing utilizes quantitative data or numerical data sets to change a visual result. Image processing may be performed for various purposes including retrieval of specific information from an image, image recognition, and image clarity or enhancement. Types of image processing may be separated into analog image processing and digital image processing where algorithms work on a digital array of pixels. A purpose of digital image enhancement may be to improve the contrast and sharpening of an image to so that it is more suitable for display or to enable further processing or analysis. For example, the removal of noise from an image, sharpening or brightening an image, or making it easier to identify key features within an image. Image enhancement may improve the quality and information content of original data before processing. The field of digital image enhancement is increasingly utilizing machine learning algorithms such as generative adversarial networks for image processing.

SUMMARY

According to one embodiment, a method, computer system, and computer program product for digital image enhancement is provided. The embodiment may include receiving a digital image being navigated by a user. The embodiment may include identifying an image content navigation pattern of the user and a context of the digital image. Based on the image content navigation pattern and context, the embodiment may include identifying one or more objects of the digital image on which the user will perform a predicted zoom-in action. The embodiment may include identifying one or more distributed computing resources for digital image enhancement of the identified one or more objects. The embodiment may include performing, via the identified one or more distributed computing resources, digital image enhancement of the identified one or more objects. Upon the user performing a zoom-in action on an identified object which matches a predicted zoom-in action, the embodiment may include displaying a digitally enhanced image of the identified object.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
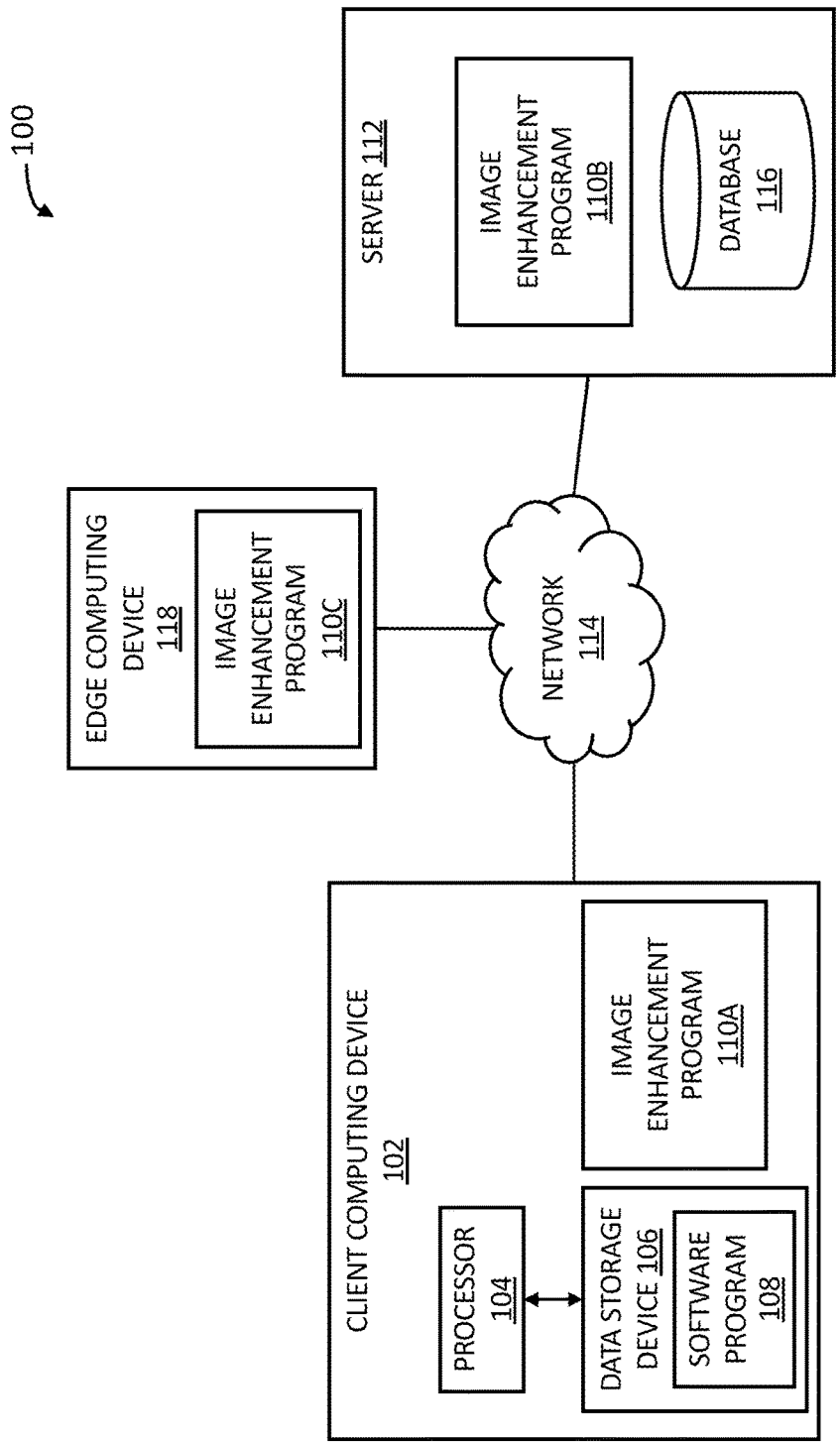
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

The present invention relates generally to the field of computing, and more particularly to digital image processing. The following described exemplary embodiments provide a system, method, and program product to, among other things, identify one or more portions of a digital image that a user may later select for a zoom-in action during navigation (e.g., scrolling, viewing) of the digital image and accordingly, proactively apply generative adversarial network (GAN) based image enhancement of the identified one or more portions of the digital image. Therefore, the present embodiment has the capacity to improve the technical field of digital image processing by dynamically enhancing the image quality one or more portions of a digital image prior to user selection of those one or more portions for a zoom-in action, thus providing the user a zoomed-in image portion, having a required image quality, in real-time when the user performs the zoom-in action on the selected image portion.

As previously described, image processing utilizes quantitative data or numerical data sets to change a visual result. Image processing may be performed for various purposes including retrieval of specific information from an image, image recognition, and image clarity or enhancement. Types of image processing may be separated into analog image processing and digital image processing where algorithms work on a digital array of pixels. A purpose of digital image enhancement may be to improve the contrast and sharpening of an image to so that it is more suitable for display or to enable further processing or analysis. For example, the removal of noise from an image, sharpening or brightening an image, or making it easier to identify key features within an image. Image enhancement may improve the quality and information content of original data before processing. The field of digital image enhancement is increasingly utilizing machine learning algorithms such as generative adversarial networks for image processing. The upscaling of a digital image, or portions thereof, is one of many applications that may benefit from using GAN-based image enhancement.

For example, a super resolution GAN (SRGAN) is a known machine learning algorithm that can upscale images to super high resolutions.

Consider a scenario in which a user is viewing and navigating a digital image. While navigating the digital image, the user may select one or more portions (e.g., points of interest) of the image to zoom-in on so that the user may view those portions in more detail. For example, during navigation of a digital satellite map image, the user may wish to view in more detail portions of the digital satellite map having routes or structures. As such, the user may select one or more of those portions and perform a zoom-in action on a selected portion. However, if a high-resolution digital image of the satellite map is not initially captured, image quality (e.g., sharpness, contrast, pixel resolution) of the selected digital satellite map portion may be reduced as the user zooms-in on that portion. Although GAN algorithms may be used for enhancing the selected portion as the user zooms-in, such image enhancement may not be performed and displayed to the user on a real-time basis as implementing a GAN algorithm (i.e., image enhancement) requires sufficient computer processing resources and some amount of execution time. It may therefore be imperative to have a system in place to identify, while a user is navigating a digital image, one or more predicted areas of the digital image in which the user will perform a zoom-in action, and proactively apply GAN-based digital image enhancement, using distributed computing resources (e.g., an edge computing ecosystem), to those identified areas so that a required quality of digital image is displayed to the user in real-time when they perform the zoom-in action within a predicted area of the digital image. Thus, embodiments of the present invention may be advantageous to, among other things, identifying navigation patterns and associated navigation contexts from observed historical learning of user digital image content navigation, predicting user zoom-in actions in one or more areas of a digital image identified via a convolutional neural network (CNN), identifying available distributed computing resources for processing of digital image enhancement, and applying GAN-based digital image enhancement to one or more identified areas of a digital image prior to user zoom-in actions in those areas. The present invention does not require that all advantages need to be incorporated into every embodiment of the invention.

According to at least one embodiment, a knowledge corpus of user image content navigation patterns and their navigation contexts (e.g., purpose of image navigation) may be created and used to train a CNN model which analyzes one or more input digital images being navigated by the user. For a given input image, the CNN model may output, among other things, one or more identified areas of the image where a user zoom-in action was performed, a level of zoom-in for each identified area, and an image quality for the level of zoom-in. During navigation of a future digital image by the user, the trained CNN model may be used to predict, among other things, portions of the image where the user will perform a zoom-in action, a level of zoom-in for each portion, and a zoomed image quality for each portion. GAN-based digital image enhancement may be proactively (i.e., before a zoom-in action is performed) applied to the predicted portions so that while zooming-in on a predicted portion, the zoomed-in portion of the image, having a required image quality, is displayed to the user in real-time. According to at least one embodiment, sufficient distributed computing resources may be identified and utilized for the GAN-based digital image enhancement of the predicted portions. According to at least one embodiment, digitally enhanced image portions may be stored among the distributed computing resources or within a computing device of the user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to identify, during navigation of a digital image by a user, one or more areas of the digital image in which the user will perform a predicted zoom-in action and proactively apply GAN-based digital image enhancement to the one or more identified areas before execution of a user zoom-in action so that, while zooming-in on an identified area, a zoomed image of the identified area having a required image quality is displayed to the user in real-time.

Referring to FIG. 1, an exemplary networked computer environment 100 is depicted, according to at least one embodiment. The networked computer environment 100 may include a client computing device 102, a server 112, and an edge computing device 118 interconnected via a communication network 114. According to at least one implementation, the networked computer environment 100 may include a plurality of client computing devices 102, servers 112, and edge computing devices 118, of which only one of each is shown for illustrative brevity. Additionally, in one or more embodiments, the client computing device 102, the server 112, and the edge computing device 118 may each host an image enhancement (IE) program 110A, 110B, 110C, respectively. In one or more other embodiments, the IE program 110A, 110B, 110C may be partially hosted on client computing device 102, server 112, and edge computing device 118 so that functionality may be separated among the devices.

The communication network 114 may include various types of communication networks, such as a wide area network (WAN), local area network (LAN), a telecommunication network, a wireless network, a public switched network and/or a satellite network. The communication network 114 may include connections, such as wired or wireless communication links or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and an IE program 110A and communicate with the server 112 and edge computing device 118 via the communication network 114, in accordance with embodiments of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running an IE program 110B and a database 116 and communicating with the client computing device 102 and edge computing device 118 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

Edge computing device 118 may be any edge device known in the art for providing an entry point into enterprise or service provider core networks, capable of connecting to the communication network 114, and transmitting and receiving data with the client computing device 102 and the server 112. Furthermore, edge computing device 118 may be a router, switch, laptop computer, netbook computer, personal computer (PC), desktop computer, server or any programmable electronic device or any network of programmable electronic devices capable of hosting and running an IE program 110C and communicating with the client computing device 102 and the server 112 via the communication network 114, in accordance with embodiments of the invention. As will be discussed with reference to FIG. 4, the edge computing device 118 may include internal components 402c and external components 404c, respectively. As previously described, one edge computing device 118 is depicted in FIG. 1 for illustrative purposes, but an edge computing ecosystem of a plurality of edge computing devices 118 may be connected via network 114.

According to the present embodiment, the IE program 110A, 110B, 110C may be a program capable of creating a historical database of user digital image content navigation patterns and associated contexts, using the historical database to train a CNN model for digital image analysis of user zoom-in actions within input digital images, implementing the trained CNN model to identify predicted areas of a digital image where one or more user zoom-in actions will occur as well as predicted details of the one or more user zoom-in actions, applying, via distributed computing resources, GAN-based digital image enhancement to the predicted areas of the digital image according to predicted user zoom-in action details, and displaying a digitally enhanced area of the digital image to user in real-time when the user performs a zoom-in action on that area. In at least one embodiment, the IE program 110A, 110B, 110C may require each user to opt-in to system usage upon opening or installation of the IE program 110A, 110B, 110C. In at least one other embodiment, the IE program 110A, 110B, 110C may be incorporated as a plug-in to another software application (e.g., as a plug-in to web mapping software). The IE method is explained in further detail below with respect to FIG. 2 and FIG. 3.

Figure 2:
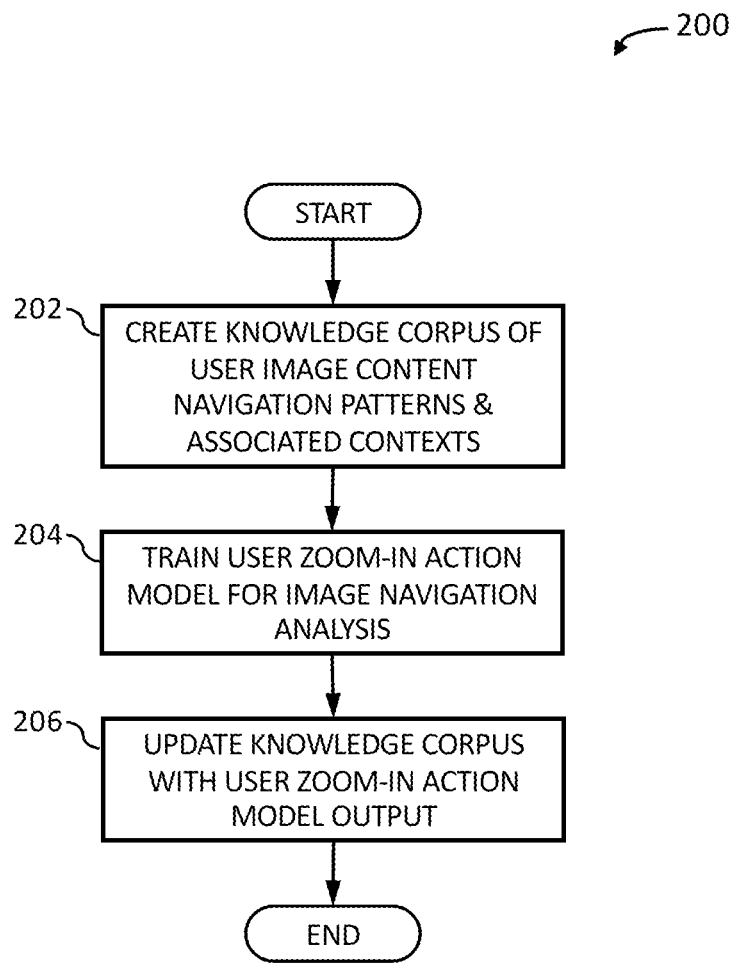
FIG. 2 illustrates an operational flowchart for an image content navigation pattern knowledge corpus creation process according to at least one embodiment.

Referring now to FIG. 2, an operational flowchart for an image content navigation pattern knowledge corpus creation and user zoom-in action model training process 200 is depicted according to at least one embodiment. At 202, the IE program 110A, 110B, 110C utilizes historical learning of observed user actions while navigating digital images to identify user image content navigation patterns. For example, while navigating a digital image, such as a digital satellite map image, a user may perform one or more actions including scrolling of the image, zoom-in of an area/object of the image, and zoom-out of an area/object of the image. The IE program 110A, 110B, 110C may record these user actions and identify related details including, but not limited to, a sequence of zoom-in actions performed among the areas/objects of the image, a level of area/object zoom-in, a zoomed-in area/object image quality (i.e., resolution), and an amount of time spent within a zoomed-in area/object of the image. Using known methods of machine learning analysis, the IE program 110A, 110B, 110C, may identify an image content navigation pattern of the user based on the observed user actions, and their related details. Furthermore, the IE program 110A, 110B, 110C may identify a context (i.e., purpose of user activity) for the digital image navigation by the user based on natural language processing (NLP) of user provided digital image search parameters or based on a user specified purpose of image content navigation. For example, before being presented with and viewing the digital satellite map image, the user may have provided search parameters, to a web mapping application (e.g., software program 108), for route navigation between two locations within a region, historical sites within a region, or sporting venues within a region. As such, in this example, a context of the digital image navigation by the user may be route navigation, historical locations, or sporting venues, respectively. The IE program 110A, 110B, 110C may associate the identified context for the digital image navigation with the digital image being navigated by the user and with the image content navigation pattern of the user. With continued reference to step 202, the IE program 110A, 110B, 110C creates a knowledge corpus of identified image content navigation patterns, and their associated contexts, for one or more users. The knowledge corpus may be stored within data storage device 106 or database 116.

Next, at 204, the IE program 110A, 110B, 110C utilizes the knowledge corpus created at 202 to train a CNN-based user zoom-in action model for digital image user navigation analysis. The CNN-based user zoom-in action model may implement known algorithms for object detection and be used to analyze input digital images being navigated by the user. For example, the IE program 110A, 110B, 110C, via the user zoom-in action model, may identify one or more features/objects (e.g., roads, trails, structures, geographic areas) within a digital image based on a context of the user navigation associated with the digital image. During training, analysis of the digital image by the user zoom-in action model may output bounding box pixel coordinates, within the digital image, of the one or more identified features/objects where the user performed a zoom-in action, a sequence of user zoom-in actions among the zoomed-in features/objects, a level of zoom performed by the user for each zoomed-in feature/object, an image quality of each zoomed-in feature/object, and an amount of time spent by the user within each zoomed-in feature/object.

According to at least one further embodiment, during training of the user zoom-in action model, the IE program 110A, 110B, 11C may identify varying levels of zoom available for features/objects within a digital image based on metadata or settings of the digital image. The IE program 110A, 110B, 110C may then zoom to each of the varying levels of zoom for each feature/object and identify a corresponding number of progressive GAN-based digital image enhancement layers required to produce a digital image at a particular level of zoom and having a particular resolution. The GAN-based digital enhancement is progressive in that preceding layer(s) of GAN-based digital enhancement, which corresponds to a level of zoom, may serve as input for next layer(s) of GAN-based digital enhancement which corresponds to a next (i.e., further) level of zoom. Consequently, GAN gradually enhances a feature/object to a particular zoom level. For example, if settings of a digital satellite map image provide zoom levels of 500 meters above (having a pixel resolution of 128×128), 300 meters above (having a pixel resolution of 256×256), and 100 meters above (having a pixel resolution of 512×512) a feature/object, and five layers of GAN-based digital image enhancement are required to produce the 500-meter zoom level image, the enhanced 500-meter zoom level image may serve as input for enhancing the 300-meter zoom level image (requiring 10 layers of GAN-based digital enhancement), and the enhanced 300-meter zoom level image may serve as input for enhancing the 100-meter zoom level image (requiring 15 layers of GAN-based digital enhancement). Ratios of zoom level to required number of progressive GAN layers of digital image enhancement for each feature/object may be included in the output of the user zoom-in action model. Quantified memory allocations for enhanced zoom level images (i.e., zoomed-in images) may also be identified and included in the output of the user zoom-in action model.

At 206, the IE program 110A, 110B, 110C updates the knowledge corpus of identified image content navigation patterns, and their associated contexts, for one or more users based on output from the user zoom-in action model resulting from the training performed in 204. As such, analysis results of the user zoom-in action model may become part of a user's digital image content navigation pattern. Furthermore, the user zoom-in action model may be iteratively trained on updated versions of the knowledge corpus. The IE program 110A, 110B, 110C may deploy a trained user zoom-in action model for analysis of future digital images navigated by a user during an implementation phase.

Figure 3:
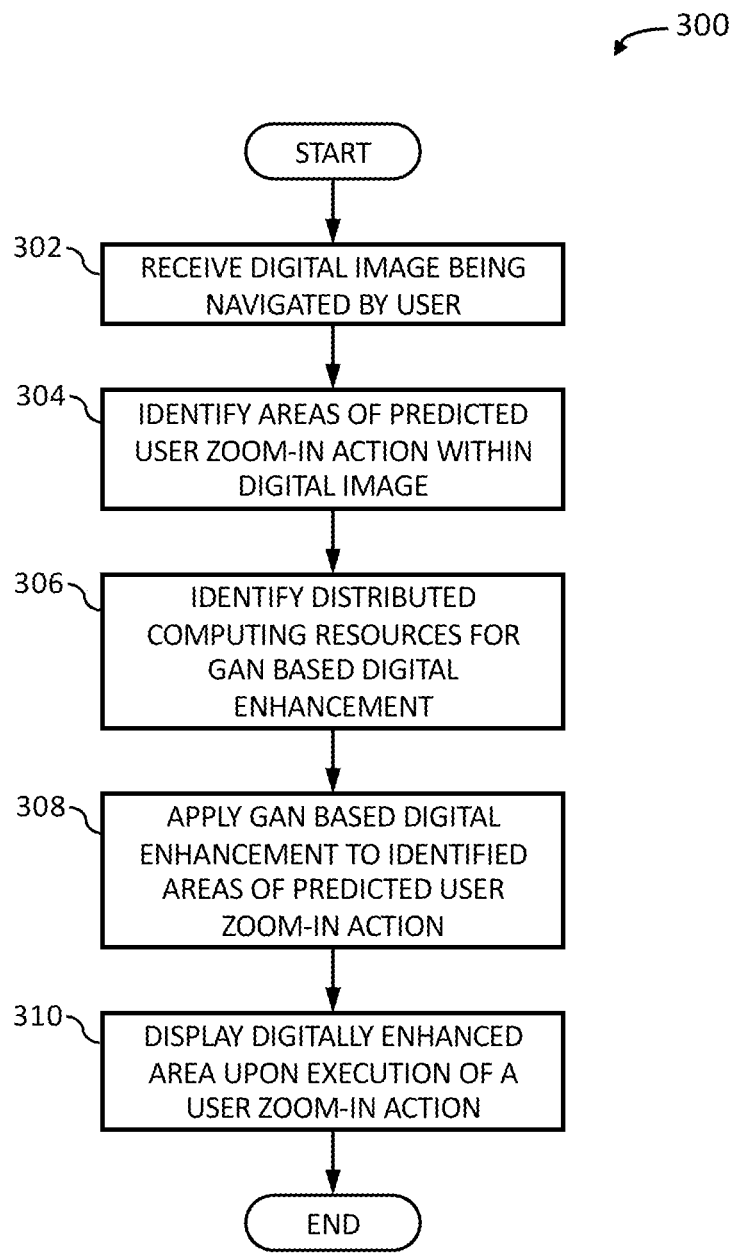
FIG. 3 illustrates an operational flowchart for enhancing a digital image in a proactive generative adversarial network based digital image enhancement process according to at least one embodiment.

Referring now to FIG. 3, an operational flowchart for enhancing a digital image during an implementation phase in a proactive progressive GAN-based digital image enhancement process 300 is depicted according to at least one embodiment. At 302, the IE program 110A, 110B, 110C receives or accesses a digital image being navigated by a user. For example, the user may be navigating a digital satellite map image via a web mapping application (e.g., software program 108) in which the IE program 110A, 110B, 110C may be incorporated as a plug-in. As such, the IE program 110A, 110B, 110C may access the digital satellite map image being navigated by the user.

Next, at 304, the IE program 110A, 110B, 110C, utilizing the user zoom-in action model trained on the knowledge corpus of identified image content navigation patterns as described in process 200, analyzes the digital image being navigated by the user to identify a context of the digital image. As described above, the context of the digital image may be based on search parameters of the user, or a user specified purpose of image content navigation. Further, at 304, based on the identified context of the digital image and the image content navigation pattern of the user (from the knowledge corpus), the IE program 110A, 110B, 110C, via the user zoom-in action model, identifies one or more areas of predicted user zoom-in action within the digital image. More specifically, the IE program 110A, 110B, 110C identifies one or more features/objects of the digital image on which the user will perform a predicted zoom-in action.

According to at least one further embodiment, in a situation where a user, navigating a digital image, does not have an image content navigation pattern within the knowledge corpus (e.g., a new user), the IE program 110A, 110B, 110C may refer to image content navigation patterns of other users navigating digital images having a same context as the digital image being navigated by the user. Moreover, the IE program 110A, 110B, 110C may observe actions of the user while navigating the digital image and create an image content navigation pattern of the user within the knowledge corpus.

With continued reference to 304, for every identified feature/object on which the user will perform a predicted zoom-in action, the IE program 110A, 110B, 110C may, via the trained user zoom-in action model, further identify bounding box pixel coordinates, within the digital image, of the feature/object where the user will perform a predicted zoom-in action, a predicted sequence of user zoom-in actions among the identified features/objects (i.e., an ordering of zooms among the features/objects), a predicted amount of zoom-in level for the feature/object, a predicted number of corresponding progressive GAN layers required to create a zoomed-in feature/object image having the predicted amount of zoom-in level, a predicted image quality of the zoomed-in feature/object image, a predicted amount of time the user will spend zoomed-in on the feature/object, and a predicted amount of memory required for the zoomed-in feature/object image.

At 306, the IE program 110A, 110B, 110C communicates with and identifies one or more distributed computing resources which will be used to implement proactive progressive GAN-based digital image enhancement of the identified one or more features/objects on which the user will perform a predicted zoom-in action. The identified one or more distributed computing resources (e.g., one or more edge computing devices 118) may be part of an edge computing ecosystem which is accessible by the IE program 110A, 110B, 110C. Identification of the one or more distributed computing resources may be based on the predictions made at 304. That is, for the identified one or more features/objects on which the user will perform a predicted zoom-in action, the IE program 110A, 110B, 110C may allocate a required amount of distributed computing resources to execute the progressive GAN-based digital image enhancement of the identified one or more features/objects according to their respective predicted requirements (i.e., bounding box pixel coordinates, zoom-in sequence number, zoom-in level, image quality, memory requirement, progressive GAN layer requirement, and amount of time spent by user while zoomed-in). According to an embodiment, while communicating with the one or more distributed computing resources, the IE program 110A, 110B, 110C may recommend, to the user, an appropriate position in the geographic surrounding so that the user may utilize an edge computing ecosystem to implement proactive progressive GAN-based digital image enhancement of the identified one or more features/objects on which the user will perform a predicted zoom-in action.

According to at least one further embodiment, in a scenario in which available distributed computing resources near a particular geographic location are limited and multiple users are attempting to zoom, from that geographic location, within particular features/objects of a digital image, the IE program 110A, 110B, 110C may dynamically prioritize allocation, among identified features/objects and among users, of the distributed computing resources based on the predicted sequence of zoom-in actions of the users, predicted zoom-in levels for the identified features/objects, and predicted amounts of time spent by the users while zoomed-in on the identified features/objects (i.e., timestamps). For example, if there are 10 users attempting to zoom in on an image from a particular geographic location and available computing resources for all 10 users are allocated from an edge device which is located near that geographic location, the IE program 110A, 110B, 110C may intelligently allocate computing resources of the edge computing device in such a way that they serve the need of the user(s) who are going to zoom in first. Consequently, the IE program 110A, 110B, 110C may not simultaneously allocate resources for all 10 users and may not simultaneously zoom in (using progressive GAN-based enhancement) on all identified features/objects. Rather, the IE program 110A, 110B, 110C identifies the zoom-in sequence and the timestamps among the users, and sequences and times the different zoom-in actions so that the computing resources for progressive GAN-based digital enhancement of identified features/objects may be allocated in an optimal way. Additionally, the IE program 110A, 110B, 110C may also consider an amount of time required to produce a progressive GAN-based digitally enhanced feature/object image (i.e., the feature/object image having the user desired zoom-level) when sequencing and timing the different zoom-in actions so that the computing resources may be allocated in an optimal way.

According to at least one further embodiment, in a scenario in which identification of one or more features/objects of a digital image on which the user will perform a predicted zoom-in action is not possible, the IE program 110A, 110B, 110C may allocate a maximum amount of available distributed computing resources for progressive GAN-based digital image enhancement of a feature/object on which the user performs a zoom-in action in real-time. The IE program 110A, 110B, 110C may also display a warning to the user communicating that generation of the digitally enhanced feature/object image having the desired zoom-in level may take a specified amount of time. Such a scenario may arise when the digital image being navigated by the user is a new image or when historical actions (e.g., navigation pattern) of the user (or similar users) are not available.

Next, at 308, the IE program 110A, 110B, 110C applies, via the one or more distributed computing resources identified at 306, progressive GAN-based digital image enhancement to the identified one or more features/objects on which the user will perform a predicted zoom-in action. Additionally, the implementation of progressive GAN-based digital image enhancement may be performed according to the predicted sequence of user zoom-in actions and timestamps identified at 306. For an identified feature/object, the progressive GAN-based digital enhancement is implemented within the identified bounding box coordinates to synthetically create a digital image based on the predicted amount of zoom-in level for the feature/object. As an illustration, consider a digital satellite map image being navigated via a web mapping application which natively supports zooming of map features/objects up to a maximum zoom image quality of 256×256 pixel resolution. Typically, zooming-in on a feature/object beyond the native maximum zoom image quality level would result in a distorted image of the feature/object being displayed, however progressive GAN-based digital enhancement utilizes the distorted image to synthetically create the image in the next layer with higher image quality and continues this process with each created image until a progressive GAN supported maximum zoom image quality level is achieved. This progressive GAN supported maximum zoom image quality level (which is greater than the native maximum zoom image quality level) may be communicated to the user as a threshold beyond which an image cannot be created.

Additionally, at 308, the digital images created as a result of progressive GAN-based digital image enhancement of the identified one or more features/objects on which the user will perform a predicted zoom-in action may be stored within memory of the identified one or more distributed computing resource (e.g., one or more edge computing devices 118) and/or within memory of a computing device of the user (e.g., client computing device 102).

At 310, upon execution by the user of a zoom-in action which matches a predicted zoom-in action on an identified feature/object, the IE program 110A, 110B, 110C retrieves the enhanced digital image for the identified feature/object created at 308 and displays it to the user in real-time. The enhanced digital image for the identified feature/object may be retrieved from the identified one or more distributed computing resources or from the computing device of the user.

It may be appreciated that FIG. 2 and FIG. 3 provide only an illustration of one implementation and do not imply any limitations with regard to how different embodiments may be implemented. Many modifications to the depicted environments may be made based on design and implementation requirements.

Figure 4:
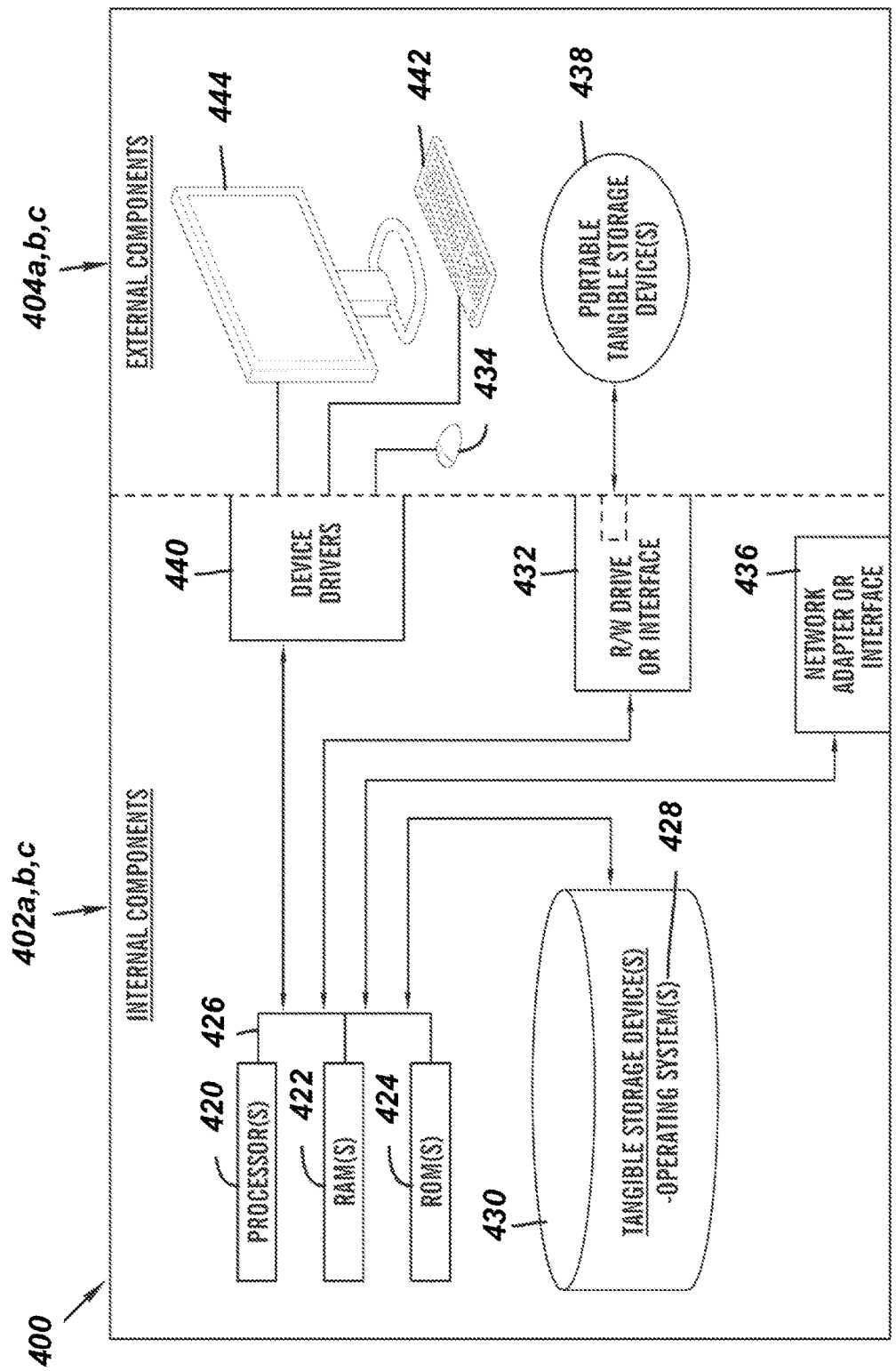
FIG. 4 is a functional block diagram of internal and external components of computers and servers depicted in FIG. 1 according to at least one embodiment.

FIG. 4 is a block diagram 400 of internal and external components of the client computing device 102, the server 112, and the edge computing device 118 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, IoT devices, edge devices, and distributed cloud computing environments that include any of the above systems or devices.

The client computing device 102, the server 112, and the edge computing device 118 may include respective sets of internal components 402 a,b,c and external components 404 a,b,c illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the IE program 110A in the client computing device 102, the IE program 110B in the server 112, and the IE program 110C in the edge computing device 118 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b,c also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the IE program 110A, 110B, 110C can be stored on one or more of the respective portable computer-readable tangible storage devices 438, read via the respective RAY drive or interface 432, and loaded into the respective hard drive 430.

Each set of internal components 402 *a,b,c* also includes network adapters or interfaces 436 such as a TCP/IP adapter cards, wireless Wi-Fi interface cards, or 3G or 4G wireless interface cards or other wired or wireless communication links. The software program 108 and the IE program 110A in the client computing device 102, the IE program 110B in the server 112, and the IE program 110C in the edge computing device 118 can be downloaded to the client computing device 102, the server 112, and the edge computing device 118 from an external computer via a network (for example, the Internet, a local area network or other, wide area network) and respective network adapters or interfaces 436. From the network adapters or interfaces 436, the software program 108 and the IE program 110A in the client computing device 102, the IE program 110B in the server 112, and the IE program 110C in the edge computing device 118 are loaded into the respective hard drive 430. The network may comprise copper wires, optical fibers, wireless transmission, routers, firewalls, switches, gateway computers and/or edge servers.

Each of the sets of external components 404 *a,b,c* can include a computer display monitor 444, a keyboard 442, and a computer mouse 434. External components 404 *a,b,c* can also include touch screens, virtual keyboards, touch pads, pointing devices, and other human interface devices. Each of the sets of internal components 402 *a,b,c* also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
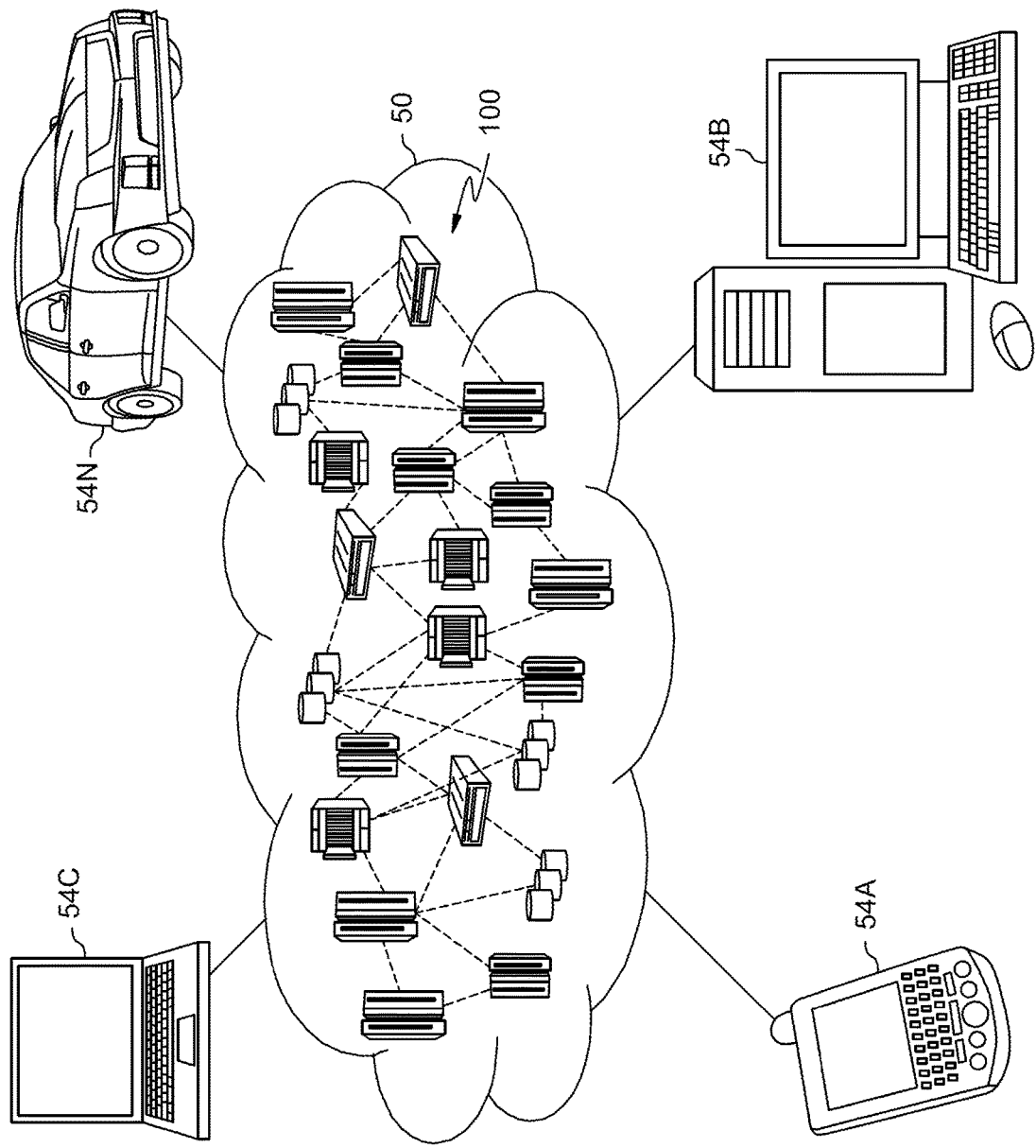
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
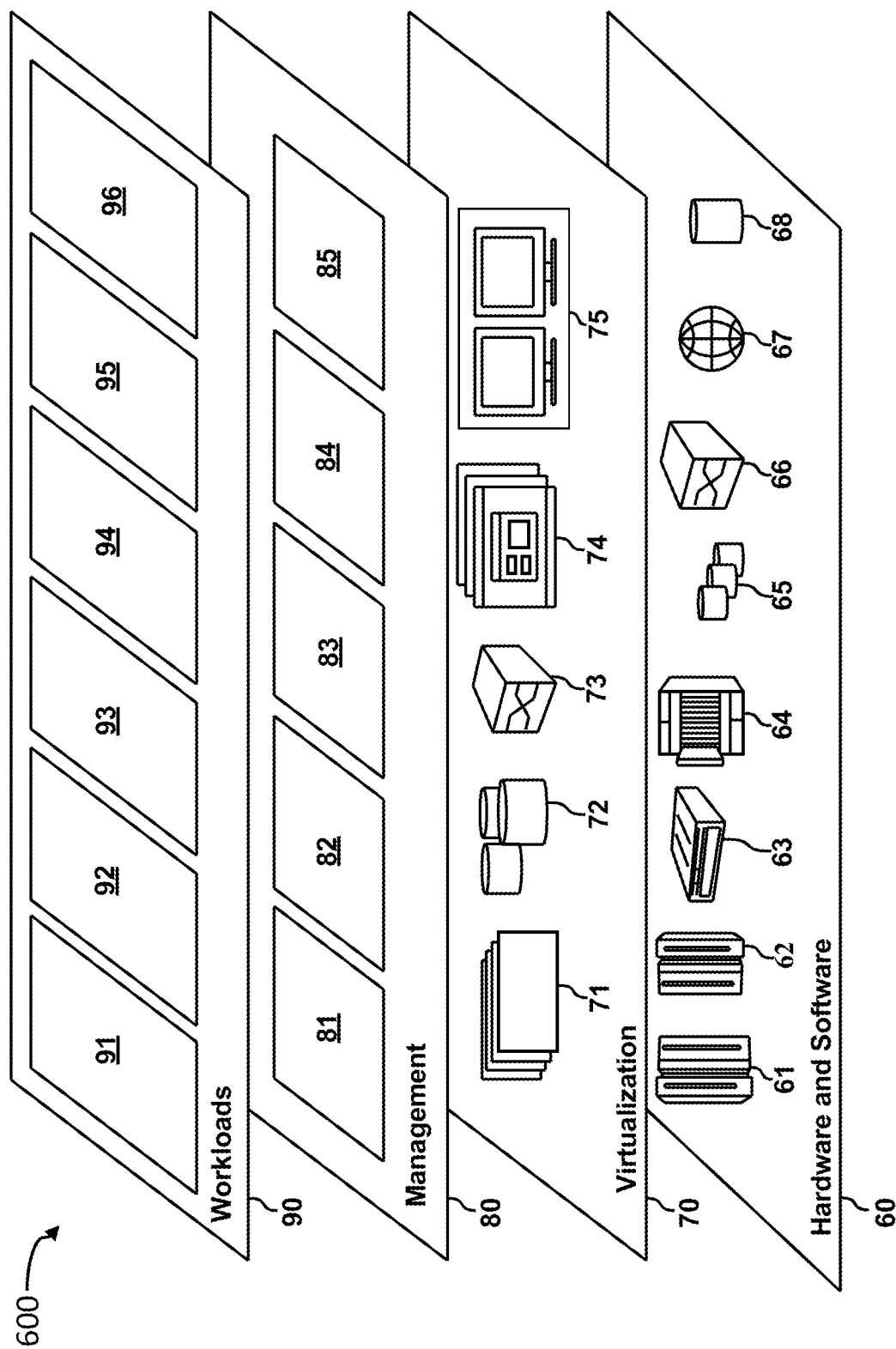
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image enhancement processing 96. Image enhancement processing 96 may relate to proactive digital enhancement of image features/objects based on predicted zoom-in actions of a user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
receiving a digital image being navigated by a user;
identifying an image content navigation pattern of the user and a context of the digital image;
based on the image content navigation pattern and context, identifying one or more objects of the digital image on which the user will perform a predicted zoom-in action, wherein identifying one or more objects on which the user will perform the predicted zoom-in action further comprises:
identifying a predicted sequence of user zoom-in actions among the one or more objects, wherein the predicted sequence comprises an ordering of zoom-ins among the one or more objects of the digital image;
identifying a predicted amount of zoom-in level for each object; and
identifying, for each object, a predicted amount of time the user will spend zoomed-in on an object;
identifying one or more distributed computing resources for digital image enhancement of the identified one or more objects;
performing, via the identified one or more distributed computing resources, digital image enhancement of the identified one or more objects, wherein performance of the digital image enhancement is allocated among the one or more distributed computing resources based on, at least, the predicted sequence of user zoom-in actions among the one or more objects, the predicted amount of zoom-in level for each object, and the predicted amount of time the user will spend zoomed-in on each object; and
upon the user performing a zoom-in action on an identified object which matches a predicted zoom-in action, displaying a digitally enhanced image of the identified object.

2. The method of claim 1, further comprising:
creating a knowledge corpus of user image content navigation patterns and associated contexts based on observed navigation actions of one or more users while navigating a set of digital images, wherein each digital image of the set of digital images has a context based on user search parameters; and
training a user zoom-in action model based on information of the knowledge corpus, wherein the user zoom-in action model performs image navigation analysis.

3. The method of claim 2, wherein identification of the one or more objects of the digital image on which the user will perform a predicted zoom-in action is performed using the user zoom-in action model.

4. The method of claim 1, wherein identifying the one or more objects of the digital image on which the user will perform a predicted zoom-in action further comprises:
- identifying, for each object, bounding box pixel coordinates, within the digital image, of the object where the user will perform a predicted zoom-in action;
- identifying a predicted number of corresponding progressive generative adversarial network (GAN) layers required to create a zoomed-in object image having a predicted amount of zoom-in level;
- identifying a predicted image quality for each zoomed-in object image; and
- identifying a predicted memory requirement for each zoomed-in object image.

5. The method of claim 1, wherein digital image enhancement of the identified one or more objects comprises progressive GAN-based digital image enhancement, and wherein performing progressive GAN-based digital image enhancement of an identified object results in an enhanced image of the identified object at a predicted zoom-in level.

6. The method of claim 1, wherein enhanced digital images of the identified one or more objects are stored within memory of the identified one or more distributed computing resources.

7. The method of claim 1, wherein the identified one or more distributed computing resources comprise an edge computing ecosystem.

8. A computer system, the computer system comprising:
- one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
  - receiving a digital image being navigated by a user;
  - identifying an image content navigation pattern of the user and a context of the digital image;
  - based on the image content navigation pattern and context, identifying one or more objects of the digital image on which the user will perform a predicted zoom-in action, wherein identifying one or more objects on which the user will perform the predicted zoom-in action further comprises:
    - identifying a predicted sequence of user zoom-in actions among the one or more objects, wherein the predicted sequence comprises an ordering of zoom-ins among the one or more objects of the digital image;
    - identifying a predicted amount of zoom-in level for each object; and
    - identifying, for each object, a predicted amount of time the user will spend zoomed-in on an object;
  - identifying one or more distributed computing resources for digital image enhancement of the identified one or more objects;
  - performing, via the identified one or more distributed computing resources, digital image enhancement of the identified one or more objects, wherein performance of the digital image enhancement is allocated among the one or more distributed computing resources based on, at least, the predicted sequence of user zoom-in actions among the one or more objects, the predicted amount of zoom-in level for each object, and the predicted amount of time the user will spend zoomed-in on each object; and
  - upon the user performing a zoom-in action on an identified object which matches a predicted zoom-in action, displaying a digitally enhanced image of the identified object.

9. The computer system of claim 8, further comprising:
- creating a knowledge corpus of user image content navigation patterns and associated contexts based on observed navigation actions of one or more users while navigating a set of digital images, wherein each digital image of the set of digital images has a context based on user search parameters; and
- training a user zoom-in action model based on information of the knowledge corpus, wherein the user zoom-in action model performs image navigation analysis.

10. The computer system of claim 9, wherein identification of the one or more objects of the digital image on which the user will perform a predicted zoom-in action is performed using the user zoom-in action model.

11. The computer system of claim 8, wherein identifying the one or more objects of the digital image on which the user will perform a predicted zoom-in action further comprises:
- identifying, for each object, bounding box pixel coordinates, within the digital image, of the object where the user will perform a predicted zoom-in action;
- identifying a predicted number of corresponding progressive generative adversarial network (GAN) layers required to create a zoomed-in object image having a predicted amount of zoom-in level;
- identifying a predicted image quality for each zoomed-in object image; and
- identifying a predicted memory requirement for each zoomed-in object image.

12. The computer system of claim 8, wherein digital image enhancement of the identified one or more objects comprises progressive GAN-based digital image enhancement, and wherein performing progressive GAN-based digital image enhancement of an identified object results in an enhanced image of the identified object at a predicted zoom-in level.

13. The computer system of claim 8, wherein enhanced digital images of the identified one or more objects are stored within memory of the identified one or more distributed computing resources.

14. The computer system of claim 8, wherein the identified one or more distributed computing resources comprise an edge computing ecosystem.

15. A computer program product, the computer program product comprising:
- one or more computer-readable tangible storage medium and program instructions stored on at least one of the one or more tangible storage medium, the program instructions executable by a processor capable of performing a method, the method comprising:
  - receiving a digital image being navigated by a user;
  - identifying an image content navigation pattern of the user and a context of the digital image;
  - based on the image content navigation pattern and context, identifying one or more objects of the digital image on which the user will perform a predicted zoom-in action, wherein identifying one or more objects on which the user will perform the predicted zoom-in action further comprises:
    - identifying a predicted sequence of user zoom-in actions among the one or more objects, wherein the predicted sequence comprises an ordering of zoom-ins among the one or more objects of the digital image;

identifying a predicted amount of zoom-in level for each object; and identifying, for each object, a predicted amount of time the user will spend zoomed-in on an object;

identifying one or more distributed computing resources for digital image enhancement of the identified one or more objects;

performing, via the identified one or more distributed computing resources, digital image enhancement of the identified one or more objects, wherein performance of the digital image enhancement is allocated among the one or more distributed computing resources based on, at least, the predicted sequence of user zoom-in actions among the one or more objects, the predicted amount of zoom-in level for each object, and the predicted amount of time the user will spend zoomed-in on each object; and upon the user performing a zoom-in action on an identified object which matches a predicted zoom-in action, displaying a digitally enhanced image of the identified object.

16. The computer program product of claim 15, further comprising:

creating a knowledge corpus of user image content navigation patterns and associated contexts based on observed navigation actions of one or more users while navigating a set of digital images, wherein each digital image of the set of digital images has a context based on user search parameters; and training a user zoom-in action model based on information of the knowledge corpus, wherein the user zoom-in action model performs image navigation analysis.

17. The computer program product of claim 16, wherein identification of the one or more objects of the digital image on which the user will perform a predicted zoom-in action is performed using the user zoom-in action model.

18. The computer program product of claim 15, wherein identifying the one or more objects of the digital image on which the user will perform a predicted zoom-in action further comprises:

identifying, for each object, bounding box pixel coordinates, within the digital image, of the object where the user will perform a predicted zoom-in action;

identifying a predicted number of corresponding progressive generative adversarial network (GAN) layers required to create a zoomed-in object image having a predicted amount of zoom-in level;

identifying a predicted image quality for each zoomed-in object image; and identifying a predicted memory requirement for each zoomed-in object image.

19. The computer program product of claim 15, wherein digital image enhancement of the identified one or more objects comprises progressive GAN-based digital image enhancement, and wherein performing progressive GAN-based digital image enhancement of an identified object results in an enhanced image of the identified object at a predicted zoom-in level.

20. The computer program product of claim 15, wherein enhanced digital images of the identified one or more objects are stored within memory of the identified one or more distributed computing resources.

* * * * *